United States Patent [19]

Sato et al.

[11] Patent Number: 4,803,737
[45] Date of Patent: Feb. 7, 1989

[54] OPTICAL DIGITIZER

[75] Inventors: Yoichi Sato; Kazuo Ichinokawa, both of Tokyo, Japan

[73] Assignee: NEC Corporation, Japan

[21] Appl. No.: 104,525

[22] Filed: Sep. 30, 1987

Related U.S. Application Data

[63] Continuation of Ser. No. 762,144, Aug. 2, 1985, abandoned.

[30] Foreign Application Priority Data

Aug. 7, 1984 [JP] Japan .................. 59-165310

[51] Int. Cl.$^4$ .......................... G06K 9/82; G06K 9/22
[52] U.S. Cl. ............................... 382/65; 382/59; 382/61; 358/280; 178/18
[58] Field of Search ............... 382/59, 60, 61, 65; 340/708, 710; 178/18, 19, 20; 358/80, 280

[56] References Cited

U.S. PATENT DOCUMENTS

| | | | |
|---|---|---|---|
| 2,816,246 | 12/1957 | Bliss | 382/61 |
| 3,123,804 | 3/1964 | Kamentsky | 382/61 |
| 3,894,178 | 7/1975 | Pugsley | 358/80 |
| 3,904,821 | 9/1975 | Whetstone et al. | 178/19 |
| 3,965,289 | 6/1976 | Pugsley | 358/80 |
| 4,115,806 | 9/1978 | Morton | 382/59 |
| 4,260,979 | 4/1981 | Smith | 382/59 |
| 4,403,339 | 9/1983 | Wevelsiep | 382/61 |
| 4,471,386 | 9/1984 | Tuhro | 358/280 |
| 4,531,230 | 7/1985 | Brogardh | 178/18 |
| 4,543,571 | 9/1985 | Bilbrey et al. | 178/18 |
| 4,574,317 | 3/1986 | Scheible | 382/59 |

Primary Examiner—Leo H. Boudreau
Assistant Examiner—Donald J. Daley
Attorney, Agent, or Firm—Laff, Whitesel, Conte & Saret

[57] ABSTRACT

A novel digitizer operable on an optical digitization basis comprises a transparent flat plate as a light active surface located on a graphic data recording medium, and a cursor functioning as an optical recognition device movable on the transparent flat plate. A predetermined coordinate correlative pattern is described on or in the transparent flat plate with a fluorescent paint. The cursor comprises a positioning arm provided on the outer periphery thereof to visually trace a data location on the recording medium in accordance with a movement of the cursor to effect positioning of the cursor with respect to the data location, an optical system including a light source, an optical filter assembly, and a light focusing lens etc., and a CCD sensor unit to sense light emitted from a partial pattern which falls within a predetermined limited visual range of the pattern. By irradiation of the pattern, fluorescent light is emitted therefrom. The optical digitizer is operative to determine position coordinates of a graphic data on the recording medium in accordance with an projected image of fluorescent light sensed by the sensor unit. Thus, such an implementation makes it possible to realize a small-sized, high accuracy digitizer completely free from influence of electromagnetic wave noise.

20 Claims, 4 Drawing Sheets

OPTICAL DIGITIZER

This application is a continuation of application Ser. No. 762,144, filed Aug. 2, 1985, now abandoned.

BACKGROUND OF THE INVENTION

The present invention relates to a novel optical digitizer for determining position of graphic data described on a recording medium such as a paper sheet. Particularly, the present invention relates to an optical digitizer configured so that a cursor is movable on a patterned member comprising fluorescent media to optically recognize the position information of the cursor from a projected image of the pattern, thus to determine position coordinates of graphic data on a recording medium.

Hitherto, a large number of position coordinates reading or recognizing devices called "digitizers" or "data tablets" have been commercialized. Such devices are operative to detect position coordinates at the time designated by a cursor slidable on a planar member. They find wide application in devices for inputting figures or characters into a computer. The above-mentioned position coordinates represent coordinate values designated by a lateral (X-axis) coordinate position and a longitudinal (Y-axis) coordinate position. For conventional digitizers, there have been proposed a system of utilizing electrostatic coupling or electromagnetic coupling, a system of utilizing voltage dividing ratio by resistors, a system of utilizing a magnetostriction phenomenon, and a system of utilizing ultrasonic wave etc. Among these systems, the digitizers of magnetostriction system have been widely utilized. They are configured so as to allow magnetostrictive pulses to be periodically propagated on a metal plate from the upper edge and the lefthand edge thereof to detect the propagation of the magnetostrictive pulses by means of a coil attached to a cursor, thereby calculating a propagation time of the magnetostrictive pulses to determine coordinates. Such a propagation time is determined based on a counted value of a counter circuit. Usually, the propagation speed of the magnetostrictive pulse is approximately 5000 m/sec. Accordingly, it is necessary to operate the counter circuit using a clock having about 100 MHz in order to obtain position coordinates with an accuracy of 0.1 mm.

However, the drawback with the above-mentioned digitizers of magnetostriction system are as follows. It is difficult to miniaturize a circuit for generating magnetostrictive pulses. Further, an excessive increase in an area of the planar member results in lowering of accuracy. Accordingly, the planar member must have a limited area. This makes it difficult to cover a wide data surface to be digitized. In addition, magnetostrictive pulses generate a large electromagnetic wave noise. In particular, when the digitizer is used in an office, the electromagnetic wave noise becomes a large noise source with respect to a private communication network, giving rise to communication fault.

To further consider problems with such a magnetostrictive digitization, a proposed digitizer shown in U.S. Pat. No. 3,904,821 will be briefly described. The coordinate digitizer comprises a data surface provided with a magnetostrictive sheet serving as nondirection transmission media, and vertical and horizontal wire conductors forming a field generating device positioned along the coordinate edges of the data surface. The coordinate digitizer further comprises trigger means for triggering the production of a magnetic field by the field generating device, and a pick-up device coupled to the transmission media and responding to the propagating vibrational mode for providing a signal to circuit means which will respond to the trigger means and to the pick up device in order to provide a position signal corresponding to the time of propagation of the vibrational mode from its time of generation to its time of pick-up.

The above-mentioned coordinate digitizer effects position determination by making use of propagation of a vibrational mode of longitudinal line strain wave across the entire axis of the nondirectional transmission media, thus providing improved operation and configuration as compared to previously proposed other digitizers operable based on the magnetostirictive principle. However, the aforesaid drawbacks generally encountered in conventional coordinate digitizers of this kind could not be solved by the digitizer disclosed in U.S. Pat. No. 3,904,821. Namely, the last-mentioned digitizer also required a pulse generator for triggering the field generating device, which is difficult to be small-sized. Also, there is a limit in regard to the size of the magnetostrictive sheet from a viewpoint of accuracy. Further, the employment of the magnetostrictive pulse results in occurrence of electromagnetic wave noise.

SUMMARY OF THE INVENTION

With the above in view, an object of the present invention is to provide a novel optical digitizer which has eliminated the drawbacks encountered in the prior arts.

Another object of the present invention is to realize an optical digitization suitable for providing a small-sized digitizer of improved accuracy, the digitizer being free from the influence of electromagnetic wave noise.

According to the present invention, there is provided an optical digitizer comprising a light active surface located above a graphic data recording medium, the light active surface comprising light emitting media arranged so as to define a coordinate correlative pattern; and optical recognition means movable on the light active surface, the optical recognition means comprising first means associated therewith to visually trace a data location on the recording medium in accordance with a movement of the optical recognition means to effect positioning of the optical recognition means with respect to the data location, second means provided within the optical recognition means, the second means being configured as an optical system having a function to irradiate the light active surface, and third means provided within the optical recognition means to sense light emitted from a partial pattern which falls within a predetermined limited visual range of the coordinate correlative pattern, the light having a wavelength different from that of light irradiated by the second means, to produce a corresponding electric signal, thereby effecting computation based on the electrical signal to determine position coordinates of the graphic data on the recording medium.

The graphic data recording medium may be a paper sheet on which figures or characters are described. The light active surface may be comprised of a transparent flat plate of plastic etc. on or in which the coordinate correlative pattern is described with a fluorescent paint. The coordinate correlative pattern is capable of emitting fluorescent light in response to the light irradiated by second means, the fluorescent light having a wavelength longer than that of the irradiation light.

The optical recognition means may be configured as a cursor movable on the flat plate, the cursor being provided with a hollow casing member having an opening opposing the surface of the flat plate. The first means may be comprised of a positioning arm having a crucial mark, provided on the outer periphery of the hollow casing member of the cursor.

The optical system constituting the second means may comprise a light source emitting the irradiation light, an optical filter having an optical characteristic to cut off light having a wavelength longer than that of the fluorescent light.

The third means may comprise a sensor unit in which a charge coupled sensor is assembled. The optical system constituting the second means may further comprise a convex lens and a second optical filter having an optical characteristic to cut off light having a wavelength shorter than that of the fluorescent light, the convex lens and the second optical filter being provided in an optical path of the fluorescent light to the charge coupled sensor.

The optical recognition means may further comprise a switch provided on the hollow casing member, a first cable connecting the sensor unit to the switch, and a second cable connecting the switch to a graphic data processor.

The light source may be a light emitting diode of GaP which emits light having a peak luminance at a wavelength of 555 nm.

The first optical filter has an optical characteristic to cut off light having a wavelength longer than 570 nm. The fluorescent paint may be Rhodamine B having an absorption peak at a wavelength of 550 to 560 nm and a luminance peak of the fluorescent light at a wavelength of about 590 nm. The second optical filter has an optical characteristic to cut off light having a wavelength shorter than 570 nm.

In another form of the optical recognition means, the second means may comprises a set of light sources irradiating fluxes of light having the same wavelength, and a set of optical filters having an optical characteristic to cut off light having a wavelength longer than that of the set of light sources. The third means further comprises a semiconductor memory for temporarily storing image information sensed by the sensor unit.

The coordinate correlative pattern may be provided in the form of lattice defined by a plurality of longitudinal and lateral straight lines intersecting with each other, both spacings between longitudinal lines and those between lateral lines being set at a multiple of integer of unit length. For performing optical encoding, binary digits (ones and zeros) are assigned to respective coordinate locations corresponding to the multiple of integer of unit length in the longitudinal and lateral directions of the lattice pattern depending upon whether the longitudinal and lateral lines exist or not at the respective coordinate locations, thus to express the respective coordinate locations by code sequence defining the M-sequence which is created by a circulating shift register.

The optical digitizer is operative to execute a processing comprising the steps of finding out data indicative of an arbitrary single straight line from the projected image data corresponding to the partial pattern optically recognized by the second means to calculate the rotational angle with respect to the longitudinal or lateral line within the visual range using the data indicative of the arbitrary single straight line, calculating respective spacings between a plurality of longitudinal and lateral lines within the visual range to determine a corresponding successive N bit code from the respective spacings thus calculated to find out a section to which the center of the visual range belongs, thus to calculate position coordinates of the center of the visual range. The processing further comprises a step of determining position coordinates of the graphic data recording medium by using a distance between the center of the visual range and a predetermined position of the first means, the rotational angle, and the position coordinates of the center of the visual range. Such a processing is periodically executed only while the optical recognition means and the processor are electrically coupled.

BRIEF DESCRIPTION OF THE DRAWINGS

The features and advantages of an optical digitizer according to the present invention will become more apparent from the following description taken in conjunction with the accompanying drawings in which.

DETAILED DESCRIPTION OF PREFERRED EMBODIMENTS

Preferred embodiments of the optical digitizer according to the present invention will be described with reference to attached drawings.

Figure 1:
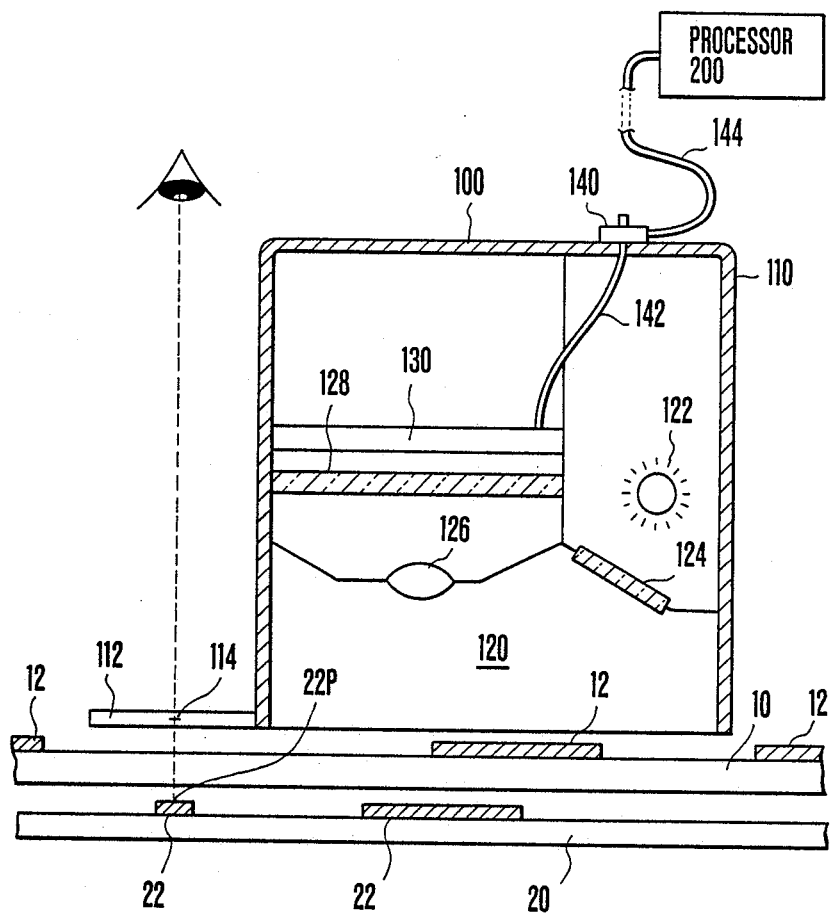
FIG. 1 is a schematic representation illustrating an embodiment of an optical digitizer according to the present invention.

FIG. 1 is a schematic side view showing a first preferred embodiment of the invention. The optical digitizer implemented in this embodiment comprises a transparent flat plate 10 of plastic etc. forming a light active surface located above a graphic recording medium 20, and a cursor 100 functioning as an optical reader or an optical recognition device movably mounted on the flat plate 10. The transparent flat plate 10 comprises light emitting media e.g. fluorescent media arranged so as to form a predetermined coordinate correlative pattern 12. More particularly, the coordinate correlative pattern 12 is described on or in the flat plate 10 with a fluorescent paint diffused into transparent polymer. The graphic recording medium 20 may be a paper sheet on which figures or characters labelled 22 are described.

The optical recognition device 100 as the cursor has a hollow casing member 110 serving as a black box with respect to an optical system assembled therein, which will be described later. The casing member 110 has an opening opposite the surface of the flat plate 10. A transparent positioning arm 112 extending in a lateral direction is provided on the outer periphery of the casing member 110. The positioning arm 112 is provided in the middle position thereof with a crucial mark 114. The provision of the positioning arm 112 allows an operator to visually trace a graphic data location on the recording medium 20 in accordance with a movement of the cursor 100, thus to effect positioning of the cursor 100 with respect to the graphic data location.

The optical recognition device 100 further comprises an optical system 120 assembled within the casing member 110. The optical system 120 comprises a light source 122, a first optical filter 124 positioned between the light source 122 and the pattern 12 of the flat plate 10, and a light focusing convex lens 126 and a second optical filter 128 which are positioned between the pattern 12 of the flat plate 10 and a sensor unit to be referred to soon. These members 122, 124, 126 and 128 constituting the optical system will be described later in greater detail.

Figure 2:
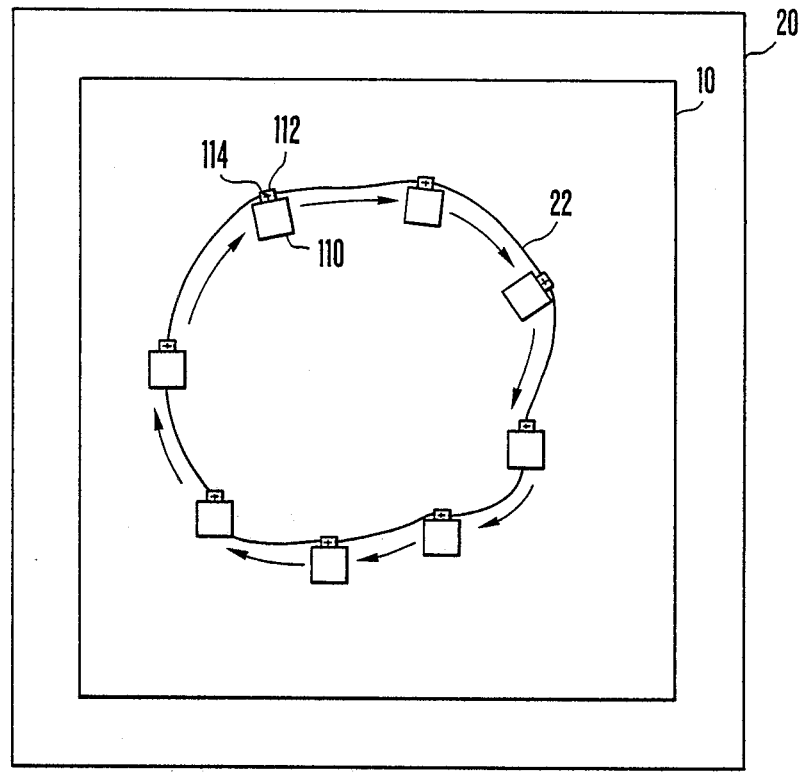
FIG. 2 is a plan view for explaining positioning of optical recognition means with respect to data location in the optical digitizer shown in FIG. 1.

The optical recognition device 100 further comprises a sensor unit 130 having a two-dimensional CCD (charge coupled device) assembled within the casing member 110, a switch 140 provided on the casing member 110, a first signal line cable 142 connecting the sensor unit 130 to the switch 140, and a second signal line cable 144 connecting the switch 140 to a graphic data processor 200. Thus, the sensor unit 130 is operative to sense light emitted from a partial pattern which falls within a predetermined limited visual range of the coordinate correlative pattern 12 to produce a corresponding electric signal, thereby effecting computation based on the electric signal in the graphic data processor to determine position coordinates of the graphic data on the coordinate medium. The above-mentioned crucial mark 114 is provided for positioning a certain FIG. 22 (a graphic data) described on the paper sheet 20 when visually tracing FIGS. 22 in order to obtain graphic information of the FIGS. 22. In the embodiment, the flat plate 10 is placed on the paper sheet 20 on which FIGS. 22 to be inputted are drawn. Thus, the position coordinates at a point 22P of a FIG. 22 is determined by moving the cursor 100 on the flat plate 10 so that the point 22P of the FIG. 22 is in register with the crucial mark 114 of the positioning arm 112 provided on cursor 100. Such a positioning viewed from the upward direction is shown in FIG. 2 wherein an indication of the pattern 12 is omitted for eliminating complexity.

Figure 3:
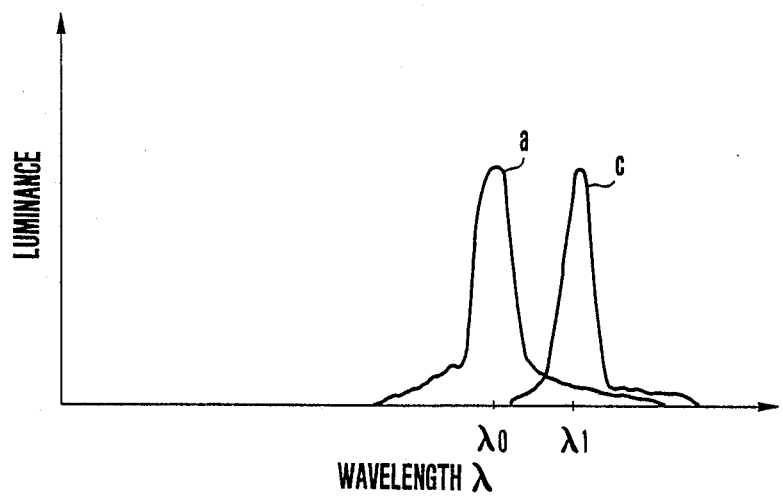
FIG. 3 shows characteristic curves of monochromatic light spectrum of a light source and a fluorescent spectrum for a pattern employed in the present invention, respectively.
Figure 4:
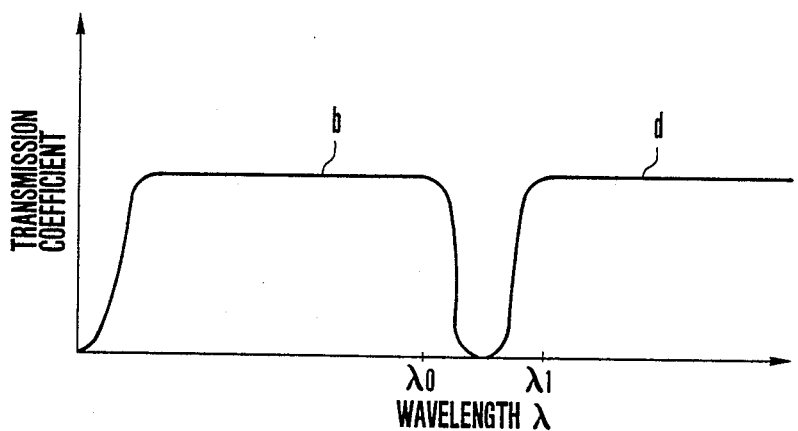
FIG. 4 shows characteristic curves of short-pass and short-cut optical filters employed in the present invention, respectively.

A method of determining position coordinates on the flat plate 10 indicative of the point 22P will be described below. As previously described, the optical system 120 provided within the hollow casing member 110 as the black box is provided with the light source 122. The light source 122 may be a light source which emits a substantially monochromatic light having a luminance peak at a wavelength of $\lambda_0$. A characteristic curve a in FIG. 3 indicates a spectrum of light irradiated from such a light source 122. For instance, a light emitting diode of GaP (gallium-phosphorus) may be used as the light source 122. The light emitting diode of GaP has a luminance peak at a wavelength of 555 nm (nano meter). Light irradiated from the light source 122 passes through the first optical filter 124 having a transmission characteristic as indicated by a characteristic curve b in FIG. 4 (e.g. a characteristic to cut off light having a wavelength longer than 570 nm when the above-mentioned LED is used) to irradiate the flat plate 10 having the pattern 12 and the paper sheet 20 positioned below. In view of the above nature, the first optical filter 124 will be referred to as a short-pass filter hereinafter. As described above, the pattern 12 is described with a fluorescent paint which has a peak of optical energy absorption at a wavelength of $\lambda_0$ to emit a fluorescence having a peak at a wavelength $\lambda_1$ ($>\lambda_0$) based on the absorbed optical energy. A characteristic curve c in FIG. 3 shows a spectrum of such a fluorescence. By way of example, Rhodamine B may be used as the fluorescent paint, which has a peak of absorption at a wavelength of 550 to 560 nm, and a luminance peak of the output fluorescence at a wavelength of about 590 nm. In this embodiment, most of components of wavelength $\lambda_0$ of the light are reflected at white portions on the paper sheet 20 where FIGS. 22 are not drawn. On the other hand, most of components of wavelength $\lambda_0$ of the light are absorbed at black portions where FIGS. 22 are drawn. The second optical filter 128 has a transmission characteristic as indicated by d in FIG. 4 (e.g. a characteristic to cut off light of a wavelength shorter than 570 nm when the above-mentioned LED and Rhodamine B are used). In view of the above nature, the second optical filter 128 will be referred to as a short cut filter thereinafter. It is apparent from this characteristic that light which has passed through the filter 124 and then has been scattered and reflected within the black box 110 is cut off by the filter 128, with the result that the light does not arrive at the CCD sensor unit 130. In contrast, since the fluorescence having the wavelength $\lambda_1$ emitting from the pattern 12 passes through the filter 128 via the convex lens 126, only the pattern 12 is projected as a positive image on the CCD sensor unit 130. The requirement of the pattern 12 drawn with a fluorescent paint on the flat plate 10 is as follows. When optically recognizing a partial pattern which falls within a limited visual range of the pattern 12, an arbitrary pattern may be used as far as position coordinates in the center of the partial pattern and a rotational angle of the visual range can be calculated.

Figure 5:
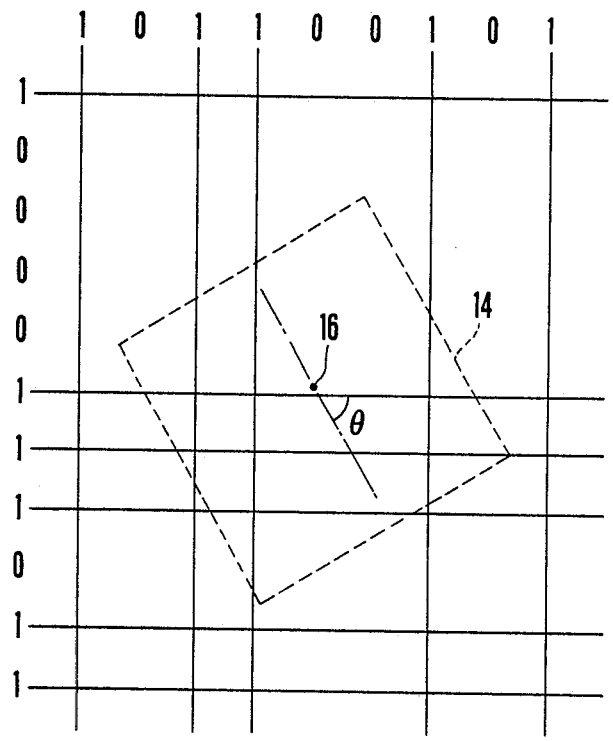
FIG. 5 is a schematic view showing an example of a pattern employed in the present invention, the pattern being described with a fluorescent paint.
Figure 6:
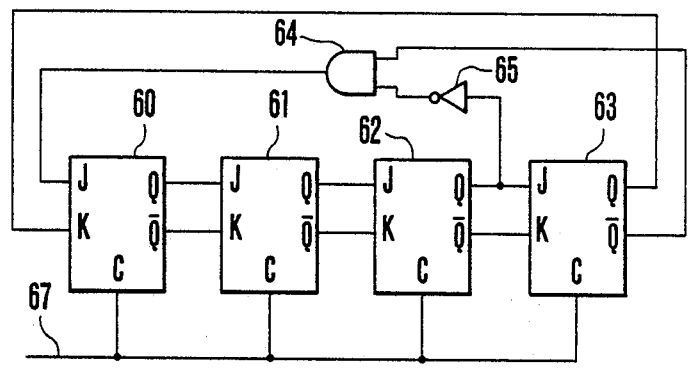
FIG. 6 is a circuit diagram illustrating an example of a circulating shift register for creating M-sequence employed in the present invention.

FIG. 5 shows a partially enlarged view of an example of the pattern 12, e.g., a lattice pattern. The spacings between longitudinal lines and those between lateral lines are set at a multiple of integer of unit length e.g. 1 mm. Apparently, these lines are drawn at random. It is now assumed that binary digits ("1" and "0") are assigned to respective coordinate locations corresponding to the multiple of integer of 1 mm in the longitudinal and lateral directions of the lattice pattern depending upon whether the longitudinal and lateral lines are present or absent at the respective coordinate locations, thus to express the respective coordinate locations by code sequence. In this embodiment, code sequence of the above nature may be M-sequence (maximum period sequence). Such M-sequence can be created by means of a circulating shift register as shown in FIG. 6. The circulating shift register comprises four stage cascade connected J-K flip-flops 60 to 63, an AND gate 64, an inverter 65, and a clock feed line 67. The M-sequence output from the AND gate 64 is defined by repetition of a bit pattern having a fifteen-bit length as expressed by 110110010100001. This sequence is characterized in that successive four bits are different from each other, respectively. Namely, when a selection of successive four bits in order from the leftmost bit of the above-mentioned bit sequence is made to obtain fifteen kinds of four bit codes different from each other, as indicated by (1101), (1011), (0110), (1100), (1001), (0010), (0101), (1010), (0100), (1000), (0000), (0001), (0011), (0111), and (1110). In general, the M-sequence created by N stages of shift registers are defined by repetition of a bit pattern having $(2^N-1)$ bit length, thus creating $(2^N-1)$ kinds of four successive N bit codes different from each other. By making use of this nature of the M-sequence, it is possible to obtain position coordinates and a rotational angle of the black box 110 on the flat plate 10 in accordance with a method described below. In FIG. 5, a square 14 as indicated by a dotted line shows an example of a visual range of the black box 110 projected on the two-dimensional CCD sensor unit 130. From a partial pattern which falls within the visual range, it is possible to calculate position coordinates and a rotational angle of the center 16 of the visual range 14. Namely, first is to find out an arbitrary single straight line from a partial pattern read by the two-dimensional CCD sensor unit 130. In this instance, it is possible to calculate an angle $\theta$ of the straight line with respect to a longitudinal or lateral line within the visual range 14 with ease. Second is to calculate spacings between longitudinal lines and these between lateral lines within the visual range 14, thereby to determine a corresponding successive four bit code of the M-sequence, thus determining a section or division to which the center 16 belongs. Precise position coordinates of the center 16 within the center 14 are determined by calculating distances from the center 16 to the respective nearest longitudinal and lateral lines. Since the distance from the center 16 within the visual range 14 of the sensor unit 130 to the crucial mark 114 is a constant value which can be known in advance, it is possible to easily obtain position coordinates from the above distance, the rotational angle $\theta$ and the position coordinates of the center 16. The above-mentioned calculation is executed by the graphic data processor 200 connected to the black box 110 through the cable 144. Such a processing is periodically effected only for a time period during which the cables 142 and 144 are electrically connected by the switch 140.

Figure 7:
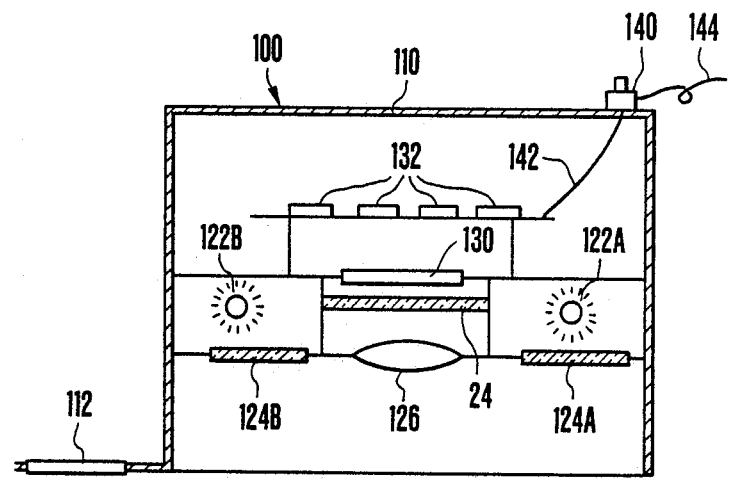
FIG. 7 is a schematic representation illustrating another embodiment of an optical digitizer according to the present invention.

Then, a second preferred embodiment of an optical digitizer according to the present invention will be described with reference to FIG. 7. The elementary configuration of this embodiment is similar to that of the first-mentioned embodiment. This embodiment is characterized in that a set of light sources 122A and 122B irradiating light fluxes having the same wave length $\lambda_2$ are provided instead of the single light source 122, in that a set of short-pass filters 124A and 124B having an optical characteristic to allow light having a wavelength shorter than $\lambda_3$ ($>\lambda_2$) to pass therethrough are provided instead of the single cut-pass filter 124, in that a semiconductor memory 132 is added to temporarily store image information sensed by the sensor unit 130, and in that fluorescent paint for the pattern 12 emitting fluorescent light having a wavelength longer than $\lambda_4$ ($>\lambda_3$) is used.

An image of a partial pattern which falls within a predetermined visual range of the pattern 12 focused on the sensor unit 130 through the convex lens 126 and the short-cut filter 128 is sensed by the sensor unit 130 as a positive image. Thus, information of the partial pattern corresponding thereto is stored in the semiconductor memory 132. The information of the image temporarily stored in the semiconductor memory 132 is fed to the graphic information processor 200 (not shown herein) via the cable 144, and then the information is processed therein in a manner similar to the method as described in the first embodiment.

As stated above, the novel optical digitizer according to the present invention can realize size reduction, improvement of accuracy and elimination of influence of electromagnetic noise.

What is claimed is:

1. An optical digitizer comprising a light active surface located above a graphic data recording medium and optical recognition means movable over said light active surface, said optical digitizer executing a processing for determining position coordinates and a rotational angle of said optical recognition means;

said light active surface comprising a light emitting media arranged to define a coordinate correlative pattern in the form of a lattice consisting of a plurality of longitudinal and lateral straight lines which intersect each other and have respectively coded spacings set at a multiple of an integer of unit length, binary digits (ones and zeros) being assigned to respective coordinate locations corresponding to the multiple of said integer of unit length in the longitudinal and lateral directions of said lattice pattern depending upon whether or not said longitudinal and lateral lines exist at said respective coordinate locations, said binary digits expressing said respective coordinate locations by means of a code sequence defining a maximum period sequence which is created by N stages of a circulating shift register and which is defined by a repetition of a bit pattern having a bit length of $(2^N-1)$ in order to create $(2^N-1)$ kinds of successive N-bit codes which are different from each other;

said optical recognition means comprising:
first means associated with said optical recognition means for visually tracing a data location on said recording medium in accordance with a movement of said optical recognition means to effect a positioning of said optical recognition means with respect to said data location; and second means within said optical recognition means for sensing light emitted from a partial pattern which falls within a predetermined limited visual range of said coordinate correlative pattern to produce a corresponding electric signal, said emitted light having a wavelength which is different from the wavelength of light irradiated by said second means, said corresponding electrical signal effecting a computation for determining position coordinates of the graphic data on said recording medium, said computation being carried out by finding data which is indicative of an arbitrary single straight line from said projected image data corresponding to said partial pattern which is optically recognized by said second means to calculate said rotational angle with respect to said longitudinal or lateral lines within said visual range by using said data which is indicative of said arbitrary single straight line, calculating respective spacings between a plurality of longitudinal and lateral lines within said visual range to determine a corresponding successive N bit code from said respective spacings in order to identify a section to which said center of said visual range belongs, thus to calculate position coordinates of said center of said visual range.

2. An optical digitizer as set forth in claim 1, wherein said graphic data recording medium is a paper sheet on which figures or characters are described.

3. An optical digitizer as set forth in claim 1, wherein said light active surface is comprised of a transparent flat plate of plastic etc. on or in which said coordinate correlative pattern is described with a fluorescent paint.

4. An optical digitizer as set forth in claim 3, wherein said coordinate correlative pattern is capable of emitting fluorescent light in response to said light irradiated by said second means, said fluorescent light having a wavelength longer than that of said irradiation light.

5. An optical digitizer as set forth in claim 3, wherein said optical recognition means is configured as a cursor movable on said flat plate, said cursor being provided with a hollow casing member having an opening opposite the surface of said flat plate.

6. An optical digitizer as set forth in claim 5, wherein said first means is comprised of a positioning arm having a crucial mark, provided on the outer periphery of said hollow casing member of said cursor.

7. An optical digitizer as set forth in claim 4, wherein said optical system constituting said second means comprises a light source emitting said irradiation light, an optical filter having an optical characteristic to cut off light having a wavelength longer than that of said irradiation light.

8. An optical digitizer as set forth in claim 7, wherein said third means comprises a sensor unit in which a charge coupled sensor is mounted.

9. An optical digitizer as set forth in claim 8, wherein said optical system constituting said second means further comprises a convex lens and a second optical filter having an optical characteristic to cut off light having a wavelength shorter than that of said fluorescent light, said convex lens and said second optical filter being provided in an optical path of said fluorescent light to said charge coupled sensor.

10. An optical digitizer as set forth in claim 8, wherein said third means further comprises a semiconductor memory for temporarily storing image information sensed by said sensor unit.

11. An optical digitizer as set forth in claim 9, wherein said second optical filter has an optical characteristic to cut off light having a wavelength shorter than 570 nm.

12. An optical digitizer as set forth in claim 7, wherein said light source is a light emitting diode of GaP.

13. An optical digitizer as set forth in claim 12, wherein said light emitting diode emits light having a peak luminance at a wavelength of 555 nm.

14. An optical digitizer as set forth in claim 7, wherein said first optical filter has an optical characteristic to cut off light having a wavelength longer than 570 nm.

15. An optical digitizer as set forth in claim 7, wherein said fluorescent paint is Rhodamine B having an absorption peak at a wavelength of 550 to 560 nm and a luminance peak of the fluorescent light at a wavelength of about 590 nm.

16. An optical digitizer as set forth in claim 7, wherein said second means comprises a set of light sources irradiating light fluxes having the same wavelength, and a set of optical filters having an optical characteristic to cut off light having a wavelength longer than that of said set of light sources.

17. An optical digitizer as set forth in claim 1, wherein said optical recognition means further comprises a switch provided on said hollow casing member, a first cable connecting said sensor unit to said switch, and a second cable connecting said switch to a graphic data processor.

18. An optical digitizer as set forth in claim 1, wherein a projected image data corresponding to a partial pattern which falls within a predetermined limited visual range of said lattice pattern is sensed by said third means.

19. An optical digitizer as set forth in claim 18, wherein said optical digitizer is operative to execute a further processing for determining position coordinates of said graphic data recording medium by using a distance between said center of said visual range and a predetermined position of said first means, said rotational angle, and said position coordinates of said center of said visual range.

20. An optical digitizer as set forth in claim 19, wherein a sequence comprising said processing and said further processing is periodically executed only during a time period while said optical recognition means and said third means are electrically coupled.

* * * * *